United States Patent [19]
Robbins et al.

[11] Patent Number: 5,297,481
[45] Date of Patent: Mar. 29, 1994

[54] SYSTEM FOR COMPACTING AND STORING SEPARATELY RECYCLABLE AND NONRECYCLABLE WASTE MATERIALS

[75] Inventors: James K. Robbins, Fayette; Danny L. Cundiff, Northport, both of Ala.

[73] Assignee: Marathon Equipment Company, Vernon, Ala.

[21] Appl. No.: 929,218

[22] Filed: Aug. 13, 1992

[51] Int. Cl.⁵ .................. B30B 7/00; B30B 1/00
[52] U.S. Cl. .................. 100/193; 100/215; 100/229 A; 220/909
[58] Field of Search ............. 100/100, 137, 185, 193, 100/194, 196, 203-206, 215, 221, 229 A; 220/23.83, 909; 414/400

[56] References Cited

U.S. PATENT DOCUMENTS

| | | | |
|---|---|---|---|
| 2,792,678 | 5/1957 | Baldwin, Jr. et al. | 100/194 X |
| 4,011,810 | 3/1977 | Santic | 100/203 X |
| 4,133,438 | 1/1979 | Liberman et al. | 100/229 AX |
| 4,907,421 | 3/1990 | Battistella | 100/194 X |
| 4,923,356 | 5/1990 | Foster | 414/400 X |
| 5,001,978 | 3/1991 | Discepolo | 100/229 AX |
| 5,116,184 | 5/1992 | Pellegrini | 220/909 X |

FOREIGN PATENT DOCUMENTS 3925188 10/1990 Fed. Rep. of Germany ... 220/23.83
1-231711 9/1989 Japan ................... 414/400

Primary Examiner—Stephen F. Gerrity
Attorney, Agent, or Firm—Arkwright & Garvey Shlesinger

[57] ABSTRACT

A system for compacting and storing separately recyclable and nonrecyclable waste materials. The system includes two separate storage and compacting units, one of which is designated for the storage of recyclable material and the other designated for the storage of nonrecyclable material. The system further includes a rack structure having a substantially horizontally extending platform and a plurality of support legs extending downwardly from the substantially horizontally extending platform. The support legs and platform form a passageway or channel for receiving at least a portion of one storage and compacting unit. The other storage and compacting unit is mounted on the substantially horizontally extending platform of the rack directly above the first compacting and storage unit.

17 Claims, 5 Drawing Sheets

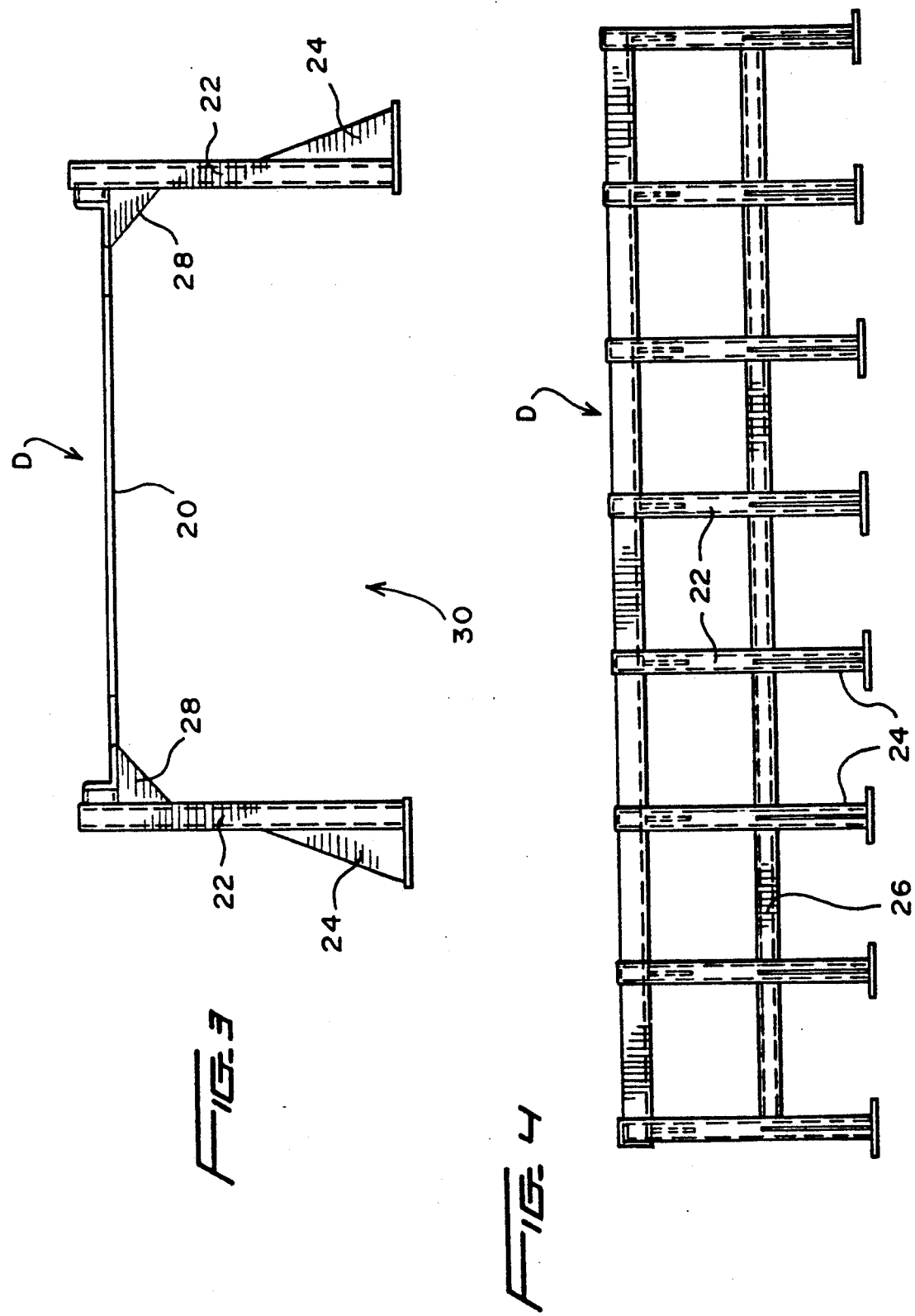

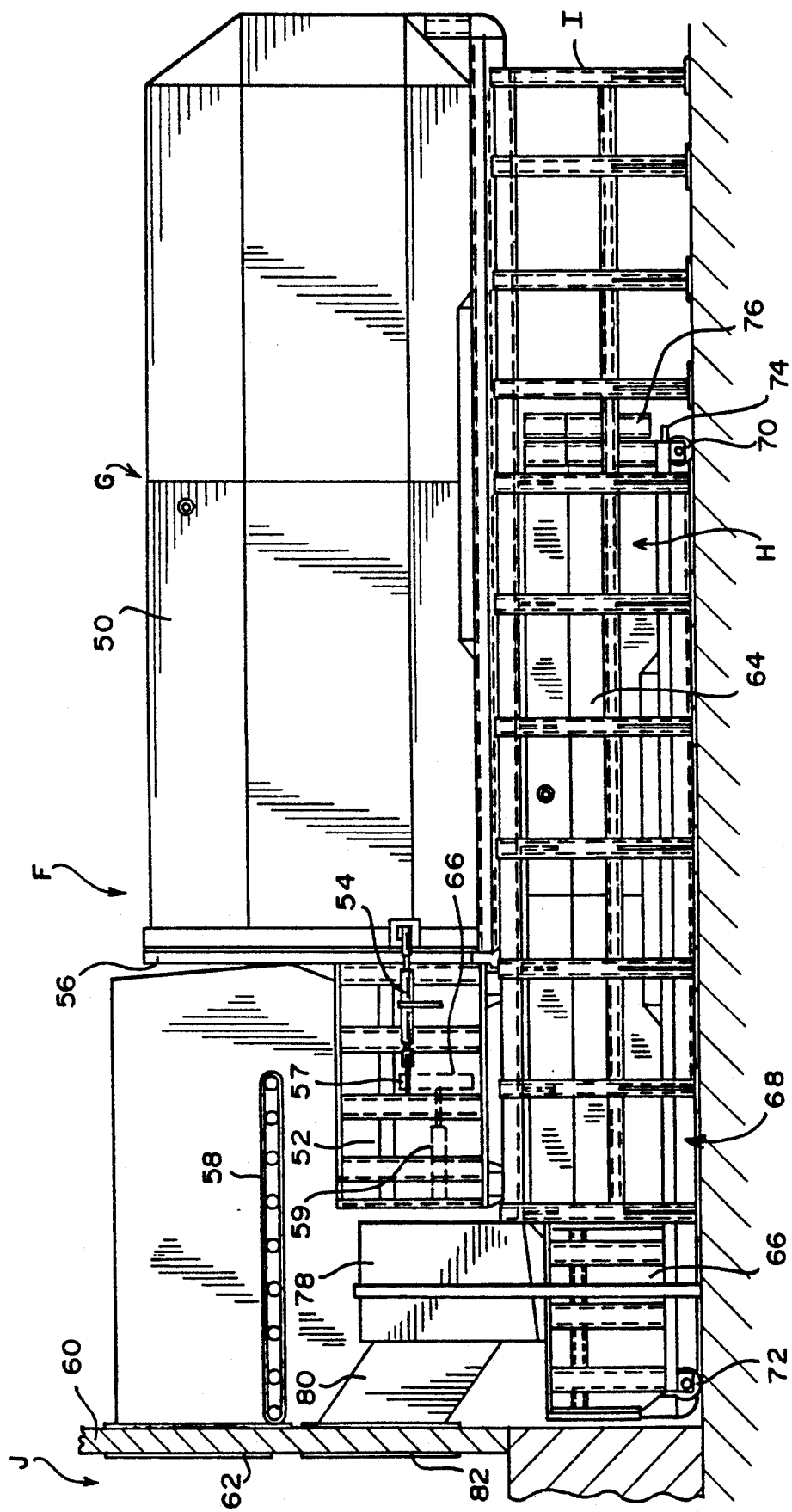

SYSTEM FOR COMPACTING AND STORING SEPARATELY RECYCLABLE AND NONRECYCLABLE WASTE MATERIALS

FIELD OF THE INVENTION

The present invention is directed to devices for storing and compacting waste materials. More specifically, a preferred embodiment of the present invention is directed to a system including two separate compacting and storage units and a support rack for storing one storage and compacting unit on top of the other thereby minimizing the floor space occupied by the two units.

BACKGROUND OF THE INVENTION

The desirability of recycling waste materials is well known. Numerous arrangements have been proposed for permitting the recycling of various waste materials. However, for recycling to be effective, it's imperative that the recycling unit be able to store both recyclable and nonrecyclable waste materials without the likelihood of contamination of the recyclable waste materials. Moreover, due to the numerous different types of recyclable material, it is often necessary to further classify and separately store different types of recyclable materials. This often results in numerous separate storage containers taking up a considerable area of a proprietors valued floor space.

Alternatively, it has been proposed to compartmentalize a single storage container to accommodate both recyclable and nonrecyclable waste materials. For example, arrangements of this type are disclosed in U.S. Pat. Nos. 4,372,726, 4,557,658 and 5,001,978. Although these arrangements do not take up as much floor space as multi-container arrangements, the proprietors' storage capacity is greatly reduced requiring more frequent disposal of waste material. This obviously leads to greater expense to the proprietor which is undoubtedly passed on to the consumer. Also, the compartmentalized storage containers can often lead to contamination of the recyclable material either stored in the waste storage compartment or at the disposal site because of improper handling by an operator.

The present invention is directed to overcoming the disadvantages of the prior art recited above as well as achieving advantages neither disclosed nor contemplated by the prior art which are discussed hereinafter.

OBJECTS AND SUMMARY OF THE INVENTION

An object of the present invention is to overcome the disadvantages of prior known systems for storing and compacting separately recyclable and nonrecyclable waste materials.

Another object of the present invention is to provide a system for compacting and storing separately recyclable and nonrecyclable waste materials which eliminate the possibility of contamination of the recyclable waste materials.

A further object of the present invention is to provide a system for storing and compacting recyclable and nonrecyclable waste materials which takes up minimal floor space and provides maximum storage capacity.

Yet a further object of the present invention is to provide a system for storing and compacting recyclable waste material wherein an operator can insert either type of material from the same loading platform.

Still a further object of the present invention is to provide a system having a rack structure which supports and houses two separate storage and compacting units in the floor space of just over one storage and compacting unit.

Yet still a further object of the present invention is to provide a system having a rack structure for supporting and housing two separate storage and compacting units while permitting each of the compacting and storage units to be readily placed on a conventional transport vehicle.

In summary, the present invention is directed to a system for compacting and storing separately recyclable and nonrecyclable waste materials. The system includes two separate storage and compacting units, one of which is designated for the storage of recyclable material and the other designated for the storage of nonrecyclable material. The system further includes a support rack having a horizontally extending platform and a plurality of vertical support legs extending downwardly from the horizontally extending platform. The vertical legs and horizontal platform form a passageway or channel for receiving at least a portion of one storage and compacting unit. The other storage and compacting unit is mounted on the horizontally extending platform of the support rack, directly above the first compacting and storage unit.

The above objects and advantages and summary of the present invention are in no way intended to limit the scope of the claims. Moreover, the identified objects and advantages are not an exhaustive compilation. Rather, other advantages will be readily apparent upon review of the following detailed description of the preferred embodiment.

DETAILED DESCRIPTION OF THE DRAWINGS

FIG. 3 is a right end elevational view of a support rack formed in accordance with the first preferred embodiment of the present invention.

FIG. 4 is a side elevational view of the support rack depicted in FIG. 3.

FIG. 5 is a side elevational view of a second preferred embodiment of the present invention.

DETAILED DESCRIPTION OF THE INVENTION

FIRST PREFERRED EMBODIMENT (FIGS. 1 TO 4)

Figure 1:
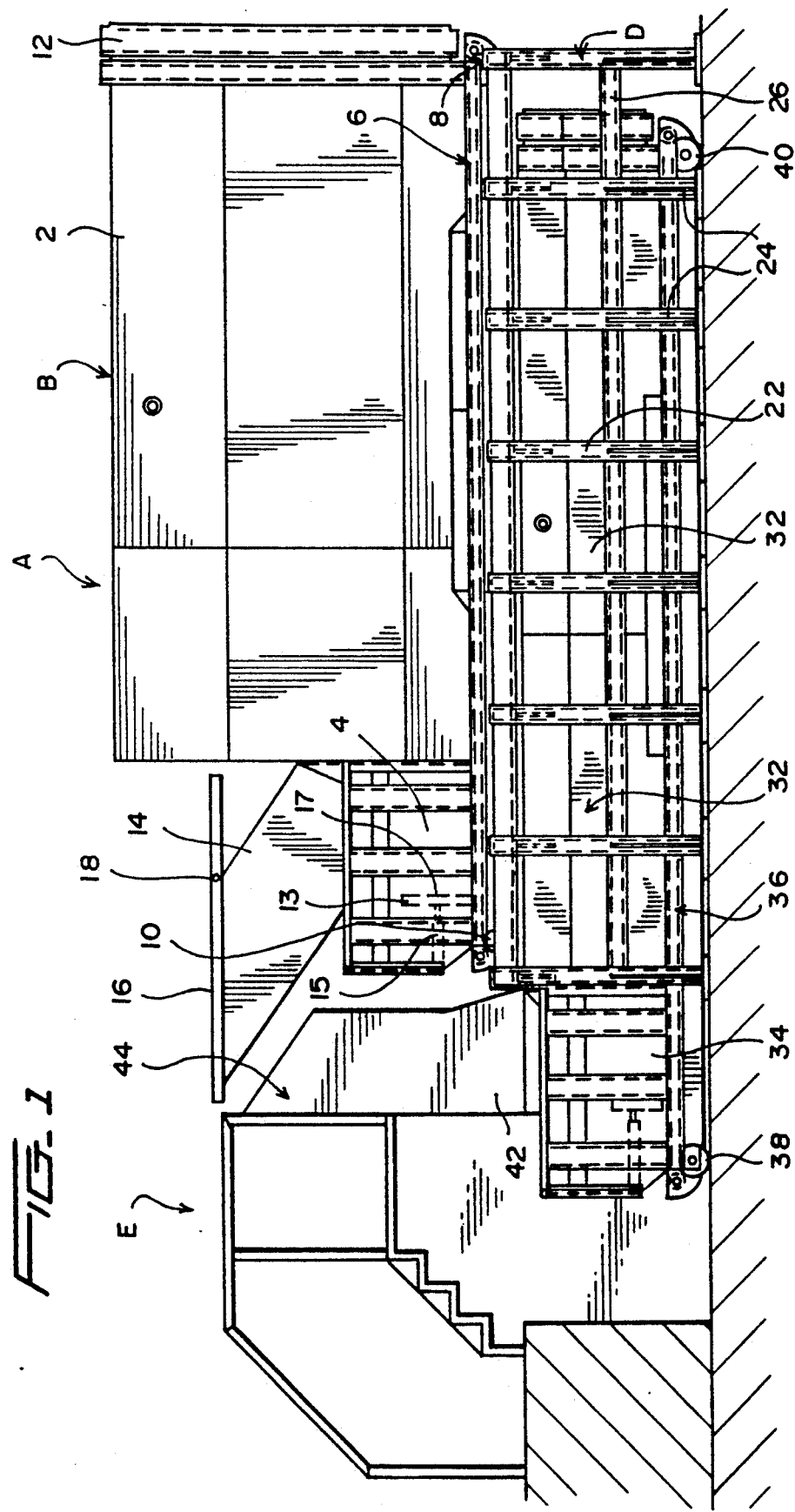
FIG. 1 is a side elevational view of a first preferred embodiment of the present invention.

The first preferred embodiment of the present invention will be described in detail hereinafter with reference made to FIGS. 1 through 4.

The recycling system A includes a first storage and compacting unit B, a second storage and compacting unit C, a support rack D and a loading platform E. The first storage and compacting unit B includes a storage container 2 and a compactor 4. The storage container 2 and compactor 4 are integrally connected and mounted on a single roll-on/roll-off skid 6 having rollers or wheelers 8 and 10 at each end thereof. The skid 6 permits the first storage and compacting unit B to be rolled on and off the support rack D. The storage container 2 is of conventional construction and has an octagon shaped cross-section. An opening is formed in the lower left end of the of the storage container 2 to permit receipt of the waste material from compacting unit 4. Further, a large exit opening is formed in the right end of storage container 2. The exit opening is sealed by a door 12 (see FIG. 2) having a sealing member extending around the outer periphery thereof. Preferably, the storage container 2 forms a single large storage compartment for receiving either recyclable or nonrecyclable waste material. However, it will be readily appreciated that storage container 2 may be provided with a plurality of partitions, if desired, so that the storage container can accommodate different classes or sub-classes of waste materials.

The compactor 4 preferably includes a single ram 13 actuated by a single piston and cylinder assembly 15, as seen in dotted lines in FIG. 1. Other ram and piston and cylinder assemblies may be employed. The upper surface of compactor 4 has an opening formed therein adjacent chute or hopper 14 so that waste material may be readily dispensed into the compactor 4. The ram 13 is movable between a storage position (shown in FIG. 1) and an operating position. In the storage position, the ram 13 is disposed rearward of the opening in the upper surface of compactor 4. Thus, the front face 17 of the ram and the side walls of the compactor 4 form a charging chamber for receiving waste materials from chute 14.

Preferably, the piston and cylinder assembly 15 is operated by conventional hydraulic drives. However, it will be readily appreciated that other drives including pneumatic drives may be used. Once the piston and cylinder assembly 15 is actuated the ram 13 advances towards the storage container 2 thereby directing the waste material in the charging chamber into the storage container 2. A closure plate 16 is operably connected to the chute 14. More specifically, the closure plate 16 is connected at hinge 18 to chute 14. As is readily evident from FIG. 1, the closure plate 16 is counter-balanced in that it extends beyond hinge 18 in the direction of storage container 2 and is sufficiently weighted such that upon lifting the closure plate 16 to gain access to the chute 14, the plate 16 will remain in the open position until closed by an operator.

Figure 2:
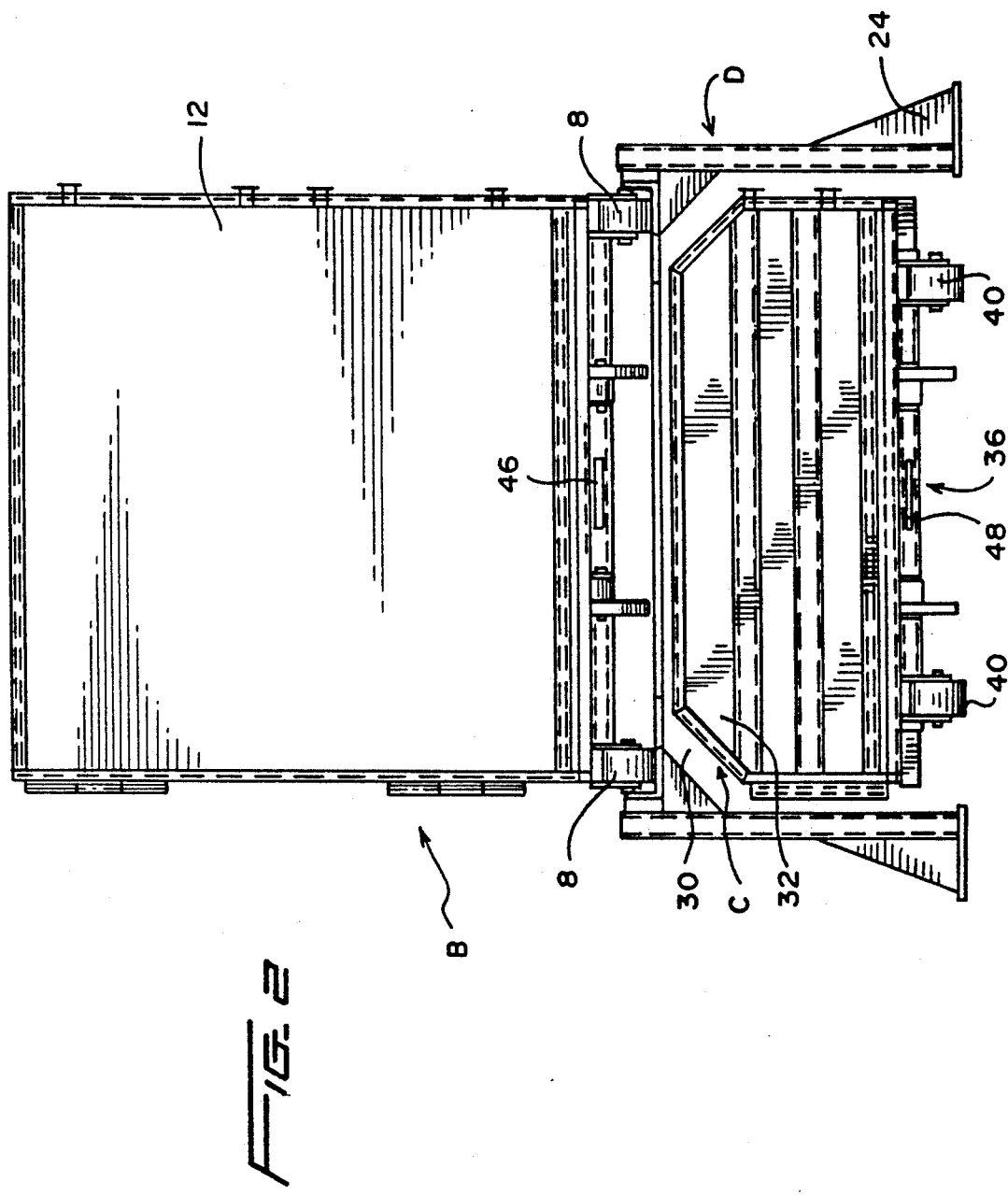
FIG. 2 is a right end elevational view of the preferred embodiment illustrated in FIG. 1.

Referring to FIG. 2, the first storage and compacting unit B is mounted on the support rack structure D. The support rack structure D includes a horizontally extending platform 20. Platform 20 is supported above the ground by a plurality of side support legs 22. An angle support 24 (see FIG. 3) extends outwardly from the base of each support leg 22 to provide the support rack D with greater stability. A channel or cross-bar 26 (see FIGS. 1 and 4) is provided on each side of support rack D and interconnects the side legs 22 providing the same with greater stability. A substantially triangularly shaped support member 28 extends inwardly from each of the side legs 22 adjacent the uppermost portion thereof and are secured to the underside of platform 20 (see FIG. 3).

As is readily evident from FIG. 2, the platform 20 and side legs 22 form a passageway or channel 30 for receiving the second storage and compacting unit C.

The second storage and compacting unit C includes a storage container 32, a compactor 34 and a roll-on/roll-off skid 36. As is readily evident from FIG. 1, the storage container 32 and compactor 34 are integrally connected to each other and mounted on skid 36. Skid 36 includes rollers or wheels 38 and 40 at each end thereof permitting the second storage container and compacting unit C to be rolled under or out from the support rack D. Preferably, the storage container 32 includes a single large storage area. However, if desired, storage container 32 may be modified in a similar manner as proposed with respect to storage container 2.

The compactor 34 is positioned rearwardly of the platform 20 of rack D. Further, the upper surface of compactor 34 has an opening formed therein adjacent hopper or chute 42 for permitting waste material to be readily dispensed into the compactor 34. Compactor 34 has a similar ram and piston and cylinder assembly to that of compactor 4.

As is readily evident from FIG. 1, an operator can dispense waste material in compactor 4 (through chute 14) or compactor 34 (through chute 42) from the same loading platform E. It will be appreciated that an opening is formed in the loading platform E about the uppermost portion 44 of the chute 42 to permit the operator to dispense waste material therein. Preferably, a pivotable closure plate or security is provided to close the opening formed adjacent area 44 of chute 42.

Referring to FIG. 2, the uppermost portions of the side walls of storage container 32 are angled complementary to the support members 28 so that the unit C can be readily positioned under or removed from passageway or channel 30 formed by support rack D.

Preferably, unit C is designated for storing nonrecyclable material while unit B is designated for storing recyclable material. By designating the lower unit for storing the nonrecyclable waste material, it is less likely that contamination of the recyclable material will occur when the operator is dispensing waste material in the units B and C. However, this arrangement may be readily reversed if the proprietor's storage needs warrants such.

Once the units B and C have been filled to capacity, conventional transport vehicles are dispatched to the location of storage system A to transport the storage units B and C to a disposal site. More specifically, to remove unit B from rack D a transport vehicle backs up to the storage system A. The horizontal platform 20 of rack D is positioned at substantially the same height as the bed of a conventional transport vehicle. This height is approximately fifty inches. Therefore, the unit B can be rolled directly onto the bed of the transport vehicle.

The transport vehicle includes a winch and the unit B includes a pull-out bar 46 to receive the hook of the winch. Once the winch is actuated, the unit B is rolled right onto the bed of the transport vehicle. A somewhat different procedure must be followed to remove unit C and place it on the bed of a conventional transport vehicle. Once again the transport vehicle backs up to the storage system A, but leaves a space sufficient to allow the storage unit C to be completely removed from underneath the support rack D. The unit C includes a pull-out bar 48 similar to pull-out bar 46 of unit B. The hook of the winch engages the pull-out bar 48 and, once actuated the winch rolls the unit C out from underneath the support rack D. The transport vehicle's bed is positioned at an incline so that the storage unit C can be rolled thereon as is customarily done.

The recycling system A permits the storage of recyclable and nonrecyclable materials with complete integrity maintained between the recyclable and nonrecyclable waste materials. This is accomplished by providing two totally separate storage and compacting units. Moreover, the recycling system A greatly enhances the storage capacity of the proprietor thereby reducing the frequency at which the storage system must be empty. Moreover, the increased storage capacity is achieved with only a minimal amount of increase in the floor space occupied by the storage system A.

SECOND PREFERRED EMBODIMENT (FIGS. 5 AND 6)

Figure 6:
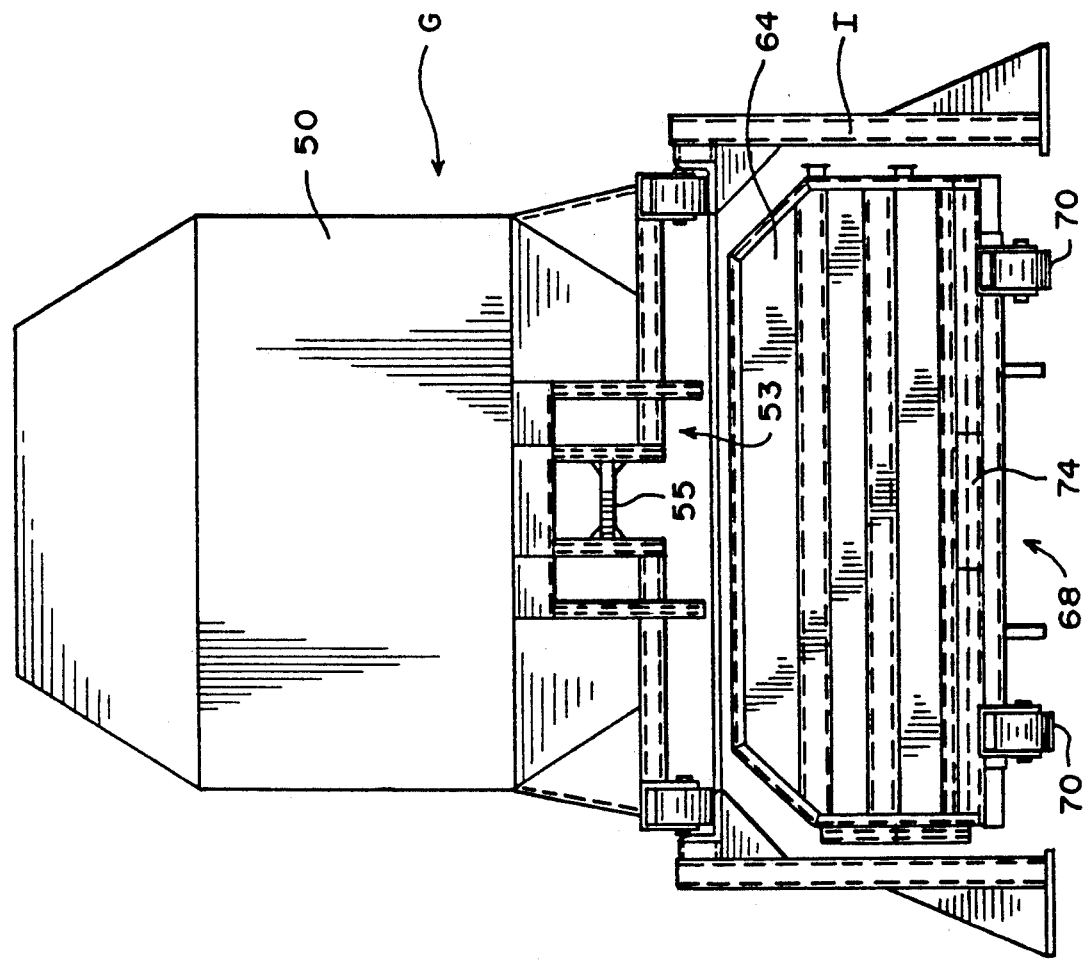
FIG. 6 is a right end elevational view of the second preferred embodiment depicted in FIG. 5.

The second preferred embodiment of the present invention will now be described with reference made to FIGS. 5 and 6.

Storage system F includes a first storage and compacting unit G, a second storage and compacting unit H, a support rack I and a loading platform J.

The first storage and compacting unit G includes a storage container 50 and a compactor 52. Compactor 52 is stationary and detachably connected to storage container 50 via conventional couplers 54. The storage container 50 preferably has a single large storage area formed therein. However, it will be readily appreciated that partitions (horizontally or vertically oriented) can be provided within container 50 to compartmentalize the same. The storage container has a single large opening formed at the left end thereof. A single door 56 closes off the large opening. However, a smaller opening is formed in door 56 to permit waste material to pass from the compactor 52 to the storage container 50. The compactor 52 has an opening formed in the upper surface thereof. The opening is formed in the upper surface of the compactor 52 forward of the conveyor 58 positioned above the compactor 52. As seen in FIGS. 5 and 6, only storage container 50 is mounted on roll-on/roll-off skid 53. Skid 53 includes a pull-out bar (see FIG. 6).

Preferably, a single ram 57 is housed in compactor 52 and is operated by a single piston and cylinder assembly 59 similar to that depicted in FIG. 1. However, other conventional ram and piston and cylinder assemblies may be readily employed. The ram 57 is movable between an operating and a storage position. In the storage position (shown in FIG. 5), the ram 57 is positioned rearwardly of the opening in the upper surface of compactor 52. Thus, the front face 61 of the ram and the side walls of the compactor form a charging chamber for receiving waste material. The piston and cylinder assembly 59 is actuated by a hydraulic drive (not shown). However, it will be readily appreciated that other drives such as pneumatic drives may be employed. Once the piston and cylinder assembly is actuated, the ram is advanced in the direction of the storage container 50 to dispense the materials in the charging chamber into the storage container 50.

Wall 60 of loading platform J includes an opening passing therethrough positioned adjacent conveyor 58. A pivotal closure plate or security door 62 seals off the opening in the wall 60 adjacent conveyor 58. It will be readily appreciated that an operator need merely lift closure plate 62 and put waste material on the conveyor 58 to dispense the waste material into the compactor 52. The conveyor 58 is actuated by a conventional drive to advance the waste material placed thereon to the opening in compactor 52.

The support rack I is of the exact same construction as rack D and therefore will not be described in detail. The storage unit H is very similar to the storage unit C disclosed in the first preferred embodiment. More specifically, unit H includes a storage container 64 and an integrally connected compactor 66 mounted on a roll-on/roll-off skid 68. The skid 68 includes rollers 70 and 72 disposed at opposite ends thereof. The skid 68 further includes a pull-out bar 74 positioned at the right end thereof. Preferably, the storage container 64 includes a single large storage area. However, by providing partitions, the storage container H may be compartmentalized, if desired. A door 76 and corresponding seal seals off the exit opening formed in the right end of the storage container 64. As is seen in FIG. 6, the uppermost portions of the side walls of storage container 64 are angled complementary to the support members 28 so that the unit H may be readily removed from underneath the rack I.

Preferably, the compactor 66 includes a single ram operably connected to a single piston and cylinder assembly of the type used in compactor 52. However, other ram and piston and cylinder assemblies may be employed. The compactor 66 has an opening formed in the upper surface thereof adjacent hopper 78. A chute 80 is operably connected at one end to hopper 78 and at the other end to an opening formed in wall 60 of loading platform J. A closure plate or security door 82 seals off the opening formed in wall 60 adjacent chute 80.

It will be readily appreciated that the storage units G and H are transported by a conventional transport vehicle to a disposal site in a very similar manner to storage units B and C of the first preferred embodiment. However, compactor 52 is uncoupled from storage container 50 prior to storage container 50 (only) being removed by a conventional transport vehicle.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

We claim:
1. A system for storing materials, comprising:
   a) a first waste storage compartment for storing waste materials therein:
   b) a second waste storage compartment for storing waste materials therein;
   c) a support member for supporting said first waste storage compartment above said second waste storage compartment;
   d) said support member includes a substantially horizontally extending platform having left and right sides, said support member further includes at least first and second side support members, said first side support member extends downwardly from said left side of said platform and said second side support member extends downwardly from said right side of said platform, said platform, said first side support member and said second side support member form a passageway for receiving said second waste storage compartment;
   e) a first compactor connected to said first waste storage compartment for compacting waste materials stored therein, one of said first and second compactors including a horizontally acting ram;
   f) a second compactor connected to said second waste storage compartment for compacting waste materials stored therein;

g) said first compactor and said first waste storage compartment being mounted on said platform.

2. An apparatus as in claim 1, further including:
a) a first roll-on/roll-off skid mounted on said platform, said first roll-on/roll-off skid having at least one wheel means, said first compactor and said first waste storage compartment being mounted on said skid for permitting said first waste storage compartment, said first compactor, and said skid to be roll-on and rolled-off said platform by a transport vehicle.

3. A system for storing waste materials, comprising;
a) a first waste storage compartment for storing waste materials therein;
b) a second waste storage compartment for storing waste materials therein;
c) a compactor connected to one of said first and second waste storage compartments for compacting waste material stored therein, said compactor including horizontally acting ram;
d) a support member for supporting said first waste storage compartment above said second waste storage compartment;
e) at least one wheel connected to said first waste storage compartment for permitting said first waste storage compartment to be moved on said support member;
f) at least one wheel connected to said second waste storage compartment for permitting said second waste storage compartment to be moved relative to said support member.

4. An apparatus as in claim 3, wherein:
a) said support member includes a substantially horizontally extending platform having left and right sides, said support member further includes at least first and second side support members, said first side support member extends downwardly from said left side of said platform and said second side support member extends downwardly from said right side of said platform, said platform, said first side support member and said second side support member form a passageway for receiving said second waste storage compartment.

5. An apparatus as in claim 4, wherein:
a) said second waste storage compartment having front and rear ends, said passageway extends at least from said front end to said rear of said second waste storage compartment.

6. An apparatus as in claim 3, wherein:
a) said first and second waste storage compartments each include front and rear ends, a first pull-out bar connected to said front end of said first waste storage compartment for receiving a hook of a winch of a transport vehicle so that the first waste storage compartment can be rolled onto the transport vehicle; and,
b) a second pull-out bar connected to said second waste storage compartment adjacent said front end for receiving a hook of a winch of a transport vehicle so that the second waste storage compartment can be rolled onto the transport vehicle.

7. An apparatus as in claim 3, further including:
a) a loading platform; and,
b) said first and second waste storage compartments being positioned adjacent said loading platform such that an operator can dispense waste materials into both said first and second waste storage compartments from said loading platform.

8. A system for storing waste materials, comprising:
a) a first waste storage compartment for storing waste materials therein;
b) a second waste storage compartment for storing waste materials therein;
c) a compactor connected to one of said first and second waste storage compartments for compacting waste material stored therein;
d) a support member for supporting said first waste storage compartment above said second waste storage compartment, said support member including a substantially horizontally extending support platform and at least one side support extending downwardly from said support platform, said support platform being fixed relative to said side support, said first waste storage compartment being positioned on top of said support platform; and,
e) said first waste storage compartment including means for moving said first waste storage compartment relative to said support member.

9. An apparatus as in claim 8, further including:
a) means for moving said second waste storage compartment relative to said support member.

10. An apparatus as in claim 9, wherein:
a) said first and second waste storage compartments each include at least one wheel operably connected thereto, said first and second waste storage compartments further include front and rear ends, a pull-out bar is secured to each of said first and second waste storage compartments adjacent corresponding front ends for receiving a hook of a winch of a transport vehicle so that said first and second waste storage compartments can be rolled onto the transport vehicle.

11. An apparatus as in claim 8, wherein said compactor connected to one of said first and second waste storage compartments further includes:
a) a first compactor connected to said first waste storage compartment for compacting waste materials stored therein;
b) a second compactor connected to said second waste storage compartment for compacting waste materials stored therein, said second compactor being positioned below said first compactor.

12. An apparatus as in claim 11, wherein:
a) said platform includes front and rear ends, at least a portion of said second compactor is positioned rearwardly of said rear end of said platform.

13. An apparatus as in claim 8, wherein:
a) said first and second storage compartments each have only a single storage area.

14. An apparatus as in claim 8, wherein:
a) said second storage compartment has a height substantially less than said first storage compartment.

15. A system for storing waste materials, comprising:
a) a first waste storage compartment for storing waste materials therein:
b) a second waste storage compartment for storing waste materials therein;
c) a support member for supporting said first waste storage compartment above said second waste storage compartment, said support member including a substantially horizontally extending support platform and at least one side support extending downwardly from said support platform, said support platform being fixed relative to said side support, said first waste storage compartment being positioned on top of said support platform;
d) a first compactor connected to said first waste storage compartment for compacting waste materials stored therein;
e) a second compactor connected to said second waste storage compartment for compacting waste materials stored therein, said second compactor being positioned below said first compactor; and,
f) a loading platform having a substantially vertically extending wall, said wall having first and second openings for permitting an operator to dispense waste material into said first and second compactors, respectively;
g) a conveyor having first and second ends, said first end being positioned adjacent one of said first and second openings, said second end being positioned adjacent one of said first and second compactors; and,
h) a chute having first and second ends, said first end being connected to the other of said first and second openings and said second end being connected to the other of said first and second compactors.

16. A system for compacting and storing waste materials, comprising:
a) a first waste storage compartment for storing waste materials therein, said first waste storage compartment including a top, a bottom and front and rear ends;
b) a first compacting unit connected to said rear end of said first waste storage compartment and removed from said front end for compacting waste materials stored therein;
c) a second waste storage compartment for storing waste materials therein, said second waste storage compartment including a top, a bottom and front and rear ends;
d) a second compacting unit connected to said rear end of said second waste storage compartment and removed from said front end for compacting waste materials stored therein;
e) a support member for supporting said first waste storage compartment above said second waste storage compartment such that at least a portion of said second compacting unit is positioned rearwardly of said first compacting unit;
f) a first roll-on/roll-off skid mounted on said support member and a second roll-on/roll-off skid positioned below said support member;
g) at least said first waste storage compartment being mounted on said first roll-on/roll-off skid, said first skid having at least one wheel means for permitting said first waste storage compartment and said first skid to be rolled-on and rolled-off said platform by a transport vehicle; and,
h) at least said second waste storage compartment being mounted on said second roll-on/roll-off skid, said second skid having at least one wheel means for permitting said second waste storage compartment and said second skid to moved relative to said platform by a transport vehicle.

17. An apparatus as in claim 16, further including:
a) a single loading platform being positioned adjacent said first and second compacting units thereby permitting an operator to dispense waste material into both of said first and second compacting units from said single loading platform.

* * * * *